US008857672B2

(12) United States Patent
Naughton et al.

(10) Patent No.: US 8,857,672 B2

(45) Date of Patent: Oct. 14, 2014

(54) CARRIAGE ASSEMBLY FOR DISPENSING TOOL

(75) Inventors: Michael Naughton, Oconomowoc, WI (US); Scott D. Eisenhardt, Pewaukee, WI (US); Steven Hachey, Waukesha, WI (US); Troy C. Thorson, Cedarburg, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 13/528,323

(22) Filed: Jun. 20, 2012

(65) Prior Publication Data

US 2012/0318826 A1 Dec. 20, 2012

Related U.S. Application Data

(60) Provisional application No. 61/498,824, filed on Jun. 20, 2011.

(51) Int. Cl.

| | |
|---|---|
| ***B65D 88/54*** | (2006.01) |
| ***G01F 11/00*** | (2006.01) |
| ***B05C 17/01*** | (2006.01) |

(52) U.S. Cl.

CPC ............. *B05C 17/0596* (2013.01); *B05C 17/01* (2013.01); *B05C 17/0103* (2013.01)

USPC ............................ 222/327; 222/325; 222/326

(58) Field of Classification Search

USPC ......... 222/327, 326, 386, 325, 391, 333, 183, 222/131

See application file for complete search history.

(56) References Cited

U.S. PATENT DOCUMENTS

| | | | | |
|---|---|---|---|---|
| 966,861 | A | 8/1910 | Rubly | |
| 1,269,438 | A | 6/1918 | Hieatzman | |
| 3,148,403 | A * | 9/1964 | Hershberger et al. | 401/263 |
| 3,208,638 | A | 9/1965 | Frenzel et al. | |
| 3,300,100 | A | 1/1967 | Sundholm | |
| 3,341,084 | A | 9/1967 | Sundholm | |

(Continued)

FOREIGN PATENT DOCUMENTS

| | | |
|---|---|---|
| CA | 2570384 | 12/2005 |
| DE | 3811954 | 10/1989 |

(Continued)

OTHER PUBLICATIONS

COX, Product Catalog, 2004 (16 pages).

(Continued)

*Primary Examiner* — Paul R Durand
*Assistant Examiner* — Benjamin R Shaw
(74) *Attorney, Agent, or Firm* — Michael Best & Friedrich LLP

(57) ABSTRACT

A carriage assembly for a dispensing tool includes a carriage having an attachment end that is attachable to the dispensing tool and an opposite dispensing end, at least one of an axial opening in the carriage oriented substantially normal to a longitudinal axis of the carriage and a radial opening through which a material-containing cartridge is insertable, a clamp member coupled to a peripheral wall of the carriage and having a portion that protrudes toward the longitudinal axis and that is engageable with a rear end of the cartridge, and a biasing member that exerts a force on the clamp member for biasing the cartridge toward the dispensing end.

12 Claims, 5 Drawing Sheets

(56) References Cited

U.S. PATENT DOCUMENTS

| | | | | |
|---|---|---|---|---|
| 3,341,085 | A | 9/1967 | Sundholm | |
| 3,381,861 | A * | 5/1968 | Stein | 222/256 |
| 3,640,431 | A | 2/1972 | Plumer | |
| 3,730,394 | A | 5/1973 | Woodson | |
| 3,768,472 | A | 10/1973 | Hodosh et al. | |
| 3,782,598 | A | 1/1974 | Basa | |
| 3,813,012 | A | 5/1974 | Laird | |
| 3,870,200 | A | 3/1975 | Spatz | |
| 3,997,085 | A | 12/1976 | Lindquist | |
| 4,113,151 | A | 9/1978 | Brown et al. | |
| 4,135,644 | A | 1/1979 | Pacetti | |
| 4,260,076 | A | 4/1981 | Bergman | |
| 4,277,194 | A | 7/1981 | Smith | |
| 4,330,070 | A | 5/1982 | Doubleday | |
| 4,339,058 | A | 7/1982 | Wendt | |
| 4,402,430 | A * | 9/1983 | Fox et al. | 222/183 |
| 4,556,156 | A | 12/1985 | Frutin | |
| 4,570,832 | A | 2/1986 | Kroger | |
| 4,583,934 | A | 4/1986 | Hata et al. | |
| 4,595,124 | A | 6/1986 | Duval et al. | |
| 4,615,469 | A | 10/1986 | Kishi et al. | |
| 4,715,518 | A | 12/1987 | Moore | |
| 4,840,293 | A | 6/1989 | Segatz | |
| 4,854,485 | A | 8/1989 | Collins | |
| 4,871,088 | A | 10/1989 | Cox | |
| 4,872,596 | A | 10/1989 | Corsette | |
| 4,877,156 | A | 10/1989 | Clanet et al. | |
| 4,890,773 | A | 1/1990 | Corsette | |
| 4,907,727 | A | 3/1990 | Ernst et al. | |
| 5,027,984 | A | 7/1991 | Gakhar et al. | |
| 5,088,630 | A | 2/1992 | Arch et al. | |
| 5,139,178 | A | 8/1992 | Arch et al. | |
| 5,161,715 | A | 11/1992 | Giannuzzi | |
| 5,176,291 | A | 1/1993 | Fillmore et al. | |
| 5,240,152 | A | 8/1993 | Scholz | |
| 5,273,190 | A | 12/1993 | Lund | |
| 5,323,931 | A | 6/1994 | Robards, Jr. et al. | |
| 5,341,964 | A * | 8/1994 | Medved | 222/327 |
| 5,353,962 | A | 10/1994 | Scholz et al. | |
| 5,370,271 | A | 12/1994 | Segatz | |
| 5,405,054 | A | 4/1995 | Thomas | |
| 5,413,255 | A | 5/1995 | Dent | |
| 5,419,466 | A | 5/1995 | Scheindel | |
| 5,492,249 | A | 2/1996 | Beach | |
| 5,556,009 | A | 9/1996 | Motzko | |
| 5,593,066 | A | 1/1997 | Konuma et al. | |
| 5,699,935 | A | 12/1997 | Stahley | |
| 5,775,533 | A | 7/1998 | Schroeder | |
| 5,775,539 | A * | 7/1998 | Bates et al. | 222/1 |
| 5,788,123 | A | 8/1998 | Hackmann et al. | |
| 5,826,751 | A | 10/1998 | Stahley et al. | |
| 5,842,604 | A | 12/1998 | Stahley et al. | |
| 5,860,568 | A | 1/1999 | Mallalieu et al. | |
| 5,897,028 | A | 4/1999 | Sauer | |
| 5,909,830 | A | 6/1999 | Bates et al. | |
| 6,039,215 | A | 3/2000 | Bell | |
| 6,039,216 | A | 3/2000 | Cummings | |
| 6,047,861 | A * | 4/2000 | Vidal et al. | 222/137 |
| 6,082,597 | A | 7/2000 | Beckett et al. | |
| 6,152,334 | A | 11/2000 | Liardon et al. | |
| 6,220,485 | B1 | 4/2001 | Chang | |
| 6,241,130 | B1 | 6/2001 | Heiberger | |
| 6,299,022 | B1 | 10/2001 | Bublewitz et al. | |
| 6,321,951 | B1 | 11/2001 | Frutin | |
| 6,386,400 | B1 | 5/2002 | Scheindel | |
| 6,415,955 | B1 | 7/2002 | Ostreicher | |
| 6,454,129 | B1 | 9/2002 | Green | |
| 6,474,510 | B2 | 11/2002 | Frutin | |
| 6,478,190 | B2 | 11/2002 | Kuge et al. | |
| 6,494,345 | B2 | 12/2002 | Schrader | |
| 6,508,385 | B1 | 1/2003 | Liardon | |
| 6,578,738 | B1 | 6/2003 | Keller | |
| 6,634,524 | B1 | 10/2003 | Helmenstein | |
| 6,701,828 | B1 | 3/2004 | Burns et al. | |
| 6,742,722 | B2 | 6/2004 | Hosoda et al. | |
| 6,745,921 | B2 | 6/2004 | Beckett | |
| 6,752,293 | B2 | 6/2004 | So | |
| 6,789,707 | B2 | 9/2004 | Wright | |
| 6,868,989 | B2 * | 3/2005 | Fahy et al. | 222/174 |
| 7,163,130 | B2 | 1/2007 | Lafond | |
| 7,192,267 | B2 | 3/2007 | Glucksman et al. | |
| 7,445,135 | B2 | 11/2008 | Miyata et al. | |
| 7,690,530 | B2 | 4/2010 | Schneider et al. | |
| 7,757,904 | B2 * | 7/2010 | Rumrill et al. | 222/391 |
| 7,913,881 | B2 | 3/2011 | Herman | |
| 8,011,538 | B2 | 9/2011 | Herman et al. | |
| 8,020,727 | B2 | 9/2011 | Herman et al. | |
| 8,393,501 | B2 * | 3/2013 | Herman et al. | 222/326 |
| 2001/0042762 | A1 | 11/2001 | Reichert | |
| 2002/0108971 | A1 * | 8/2002 | Lafond | 222/333 |
| 2005/0051571 | A1 | 3/2005 | Carruth et al. | |
| 2007/0068973 | A1 * | 3/2007 | Herman | 222/386 |
| 2007/0235475 | A1 | 10/2007 | Schneider et al. | |
| 2009/0065527 | A1 | 3/2009 | Buck | |
| 2009/0110786 | A1 | 4/2009 | Wells | |
| 2009/0179045 | A1 | 7/2009 | Cadden | |
| 2009/0272761 | A1 | 11/2009 | Cadden | |
| 2009/0272767 | A1 | 11/2009 | Herman et al. | |
| 2009/0277970 | A1 | 11/2009 | Lind et al. | |
| 2009/0302055 | A1 | 12/2009 | Cadden et al. | |
| 2010/0140298 | A1 * | 6/2010 | Anderson et al. | 222/183 |
| 2011/0278327 | A1 | 11/2011 | Herman et al. | |

FOREIGN PATENT DOCUMENTS

| | | |
|---|---|---|
| EP | 0836534 | 9/2002 |
| WO | 0171293 | 9/2001 |
| WO | 2006015596 | 2/2006 |

OTHER PUBLICATIONS

COX, Catalogs, Apr. 4, 2005, (date according to waybackmachine.com), {Retrieved May 24, 2011} Retrieved from the Internet <URL: http://www.cox-applicators.com/catalogs.asp>.

Milwaukee Electric Tool Corporation, 14.4V Cordless Caulk & Adhesive Gun Kits, Online Product Sheet, Jun. 25, 2006, (date according to waybackmachine.com), {Retrieved on May 24, 2011} Retrieved from the Internet <URL: http://www.mytoolstore.com/milwauke/6562>.

Milwaukee Electric Tool Corporation, Tool Catalog: Heavy-Duty Caulk & Adhesive Guns, 2003 (3 pages).

Milwaukee Electric Tool Corporation, Cordless 2.4 Volt Screwdriver and Cordless 2.4 Volt Caulking Gun, 1997 (2 pages).

Milwaukee Electric Tool Corporation, 14.4 Cordless Caulk Gun Service Parts List, Oct. 2006 ( 2 pages).

Milwaukee Electric Tool Corporation, 14.4 Cordless Caulk Gun Operator's Manual, Oct. 2006 (21 pages).

* cited by examiner

CARRIAGE ASSEMBLY FOR DISPENSING TOOL

CROSS-REFERENCE TO RELATED APPLICATIONS

This application claims priority to U.S. Provisional Patent Application No. 61/498,824 filed on Jun. 20, 2011, the entire content of which is incorporated herein by reference.

FIELD OF THE INVENTION

The present invention relates to power tools, and more particularly to material-dispensing tools.

BACKGROUND OF THE INVENTION

Dispensing tools, such as those used for dispensing caulk, adhesives, or the like materials, are typically manually operated by squeezing or grasping a handle of the dispensing tool. The handle is typically connected to a rack via an advancing mechanism (e.g., a ratchet and pawl-type mechanism) to incrementally advance the rack and cause the caulk, adhesive, or like material to be discharged from a cartridge. Other dispensing tools may include a motor drivably coupled to the rack for advancing the rack in response to activation of the motor.

Both types of dispensing tools typically include a carriage having a slot along the length thereof through which a material-containing cartridge may be inserted. The cartridge is typically shorter than the slot in the carriage to allow sufficient room for insertion. As such, the cartridge is typically unconstrained within the carriage and is free to move back and forth when a plunger attached to a front end of the rack does not maintain pressure against the rear of the cartridge.

SUMMARY OF THE INVENTION

The invention provides, in one aspect, a carriage assembly for a dispensing tool. The assembly includes a carriage having an attachment end that is attachable to the dispensing tool and an opposite dispensing end, at least one of an axial opening in the carriage oriented substantially normal to a longitudinal axis of the carriage and a radial opening through which a material-containing cartridge is insertable, a clamp member coupled to a peripheral wall of the carriage and having a portion that protrudes toward the longitudinal axis and that is engageable with a rear end of the cartridge, and a biasing member that exerts a force on the clamp member for biasing the cartridge toward the dispensing end.

The invention provides, in another aspect, a carriage assembly for a dispensing tool. The assembly includes a carriage having an attachment end that is attachable to the dispensing tool and an opposite dispensing end, at least one of an axial opening in the carriage oriented substantially normal to a longitudinal axis of the carriage and a radial opening through which a material-containing cartridge is insertable, and a lip coupled to a peripheral wall of the carriage and protruding toward the longitudinal axis. The lip is engageable with a rear end of the cartridge.

The invention provides, in yet another aspect, a carriage assembly for a dispensing tool. The assembly includes a carriage having an attachment end that is attachable to the dispensing tool and an opposite dispensing end, at least one of an axial opening in the carriage oriented substantially normal to a longitudinal axis of the carriage and a radial opening through which a material-containing cartridge is insertable, and a spacer at least partially positioned within the carriage. The spacer includes a first end that is engageable with an axial surface on the dispensing tool, and a second end engageable with a rear end of the cartridge.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
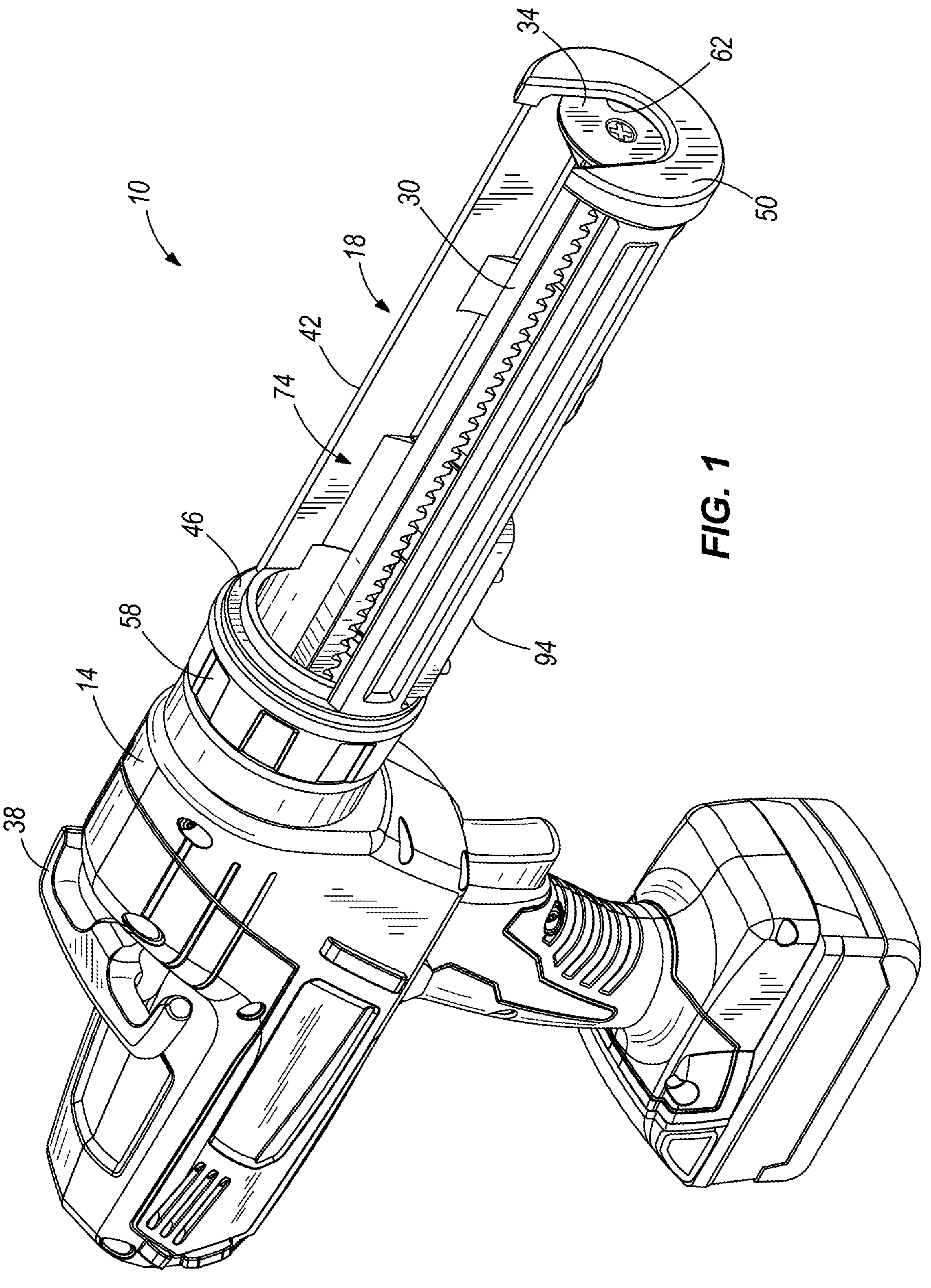
FIG. 1 is a perspective view of a dispensing tool including a carriage assembly according to one embodiment of the invention.

FIG. 1 illustrates a powered dispensing tool 10 including a main housing 14 and a carriage assembly 18 attached to the main housing 14 for supporting a tubular cartridge of caulk, adhesive, or other material to be dispensed. Such tubular cartridges typically include an outer, hollow tube 22 (FIG. 3) in which the material is contained, a movable piston (not shown) disposed proximate a rear end 26 of the tube 22, and a nozzle (not shown) disposed proximate a front end of the tube 22. With reference to FIG. 1, the tool 10 also includes a rack 30 having one end coupled to a plunger 34 and an opposite end accessible from the rear of the main housing 14. A handle 38 is coupled to the rack 30 to facilitate grasping the rack 30 to manually advance or retract the rack 30 relative to the main housing 14. The plunger 34 is movable within the carriage assembly 18 in response to the rack 30 being driven or otherwise moved in a forward or reverse direction. The plunger 34 is engageable with the piston in the cartridge to exert a force on the material within the cartridge, causing it to be discharged from the nozzle.

Figure 2:
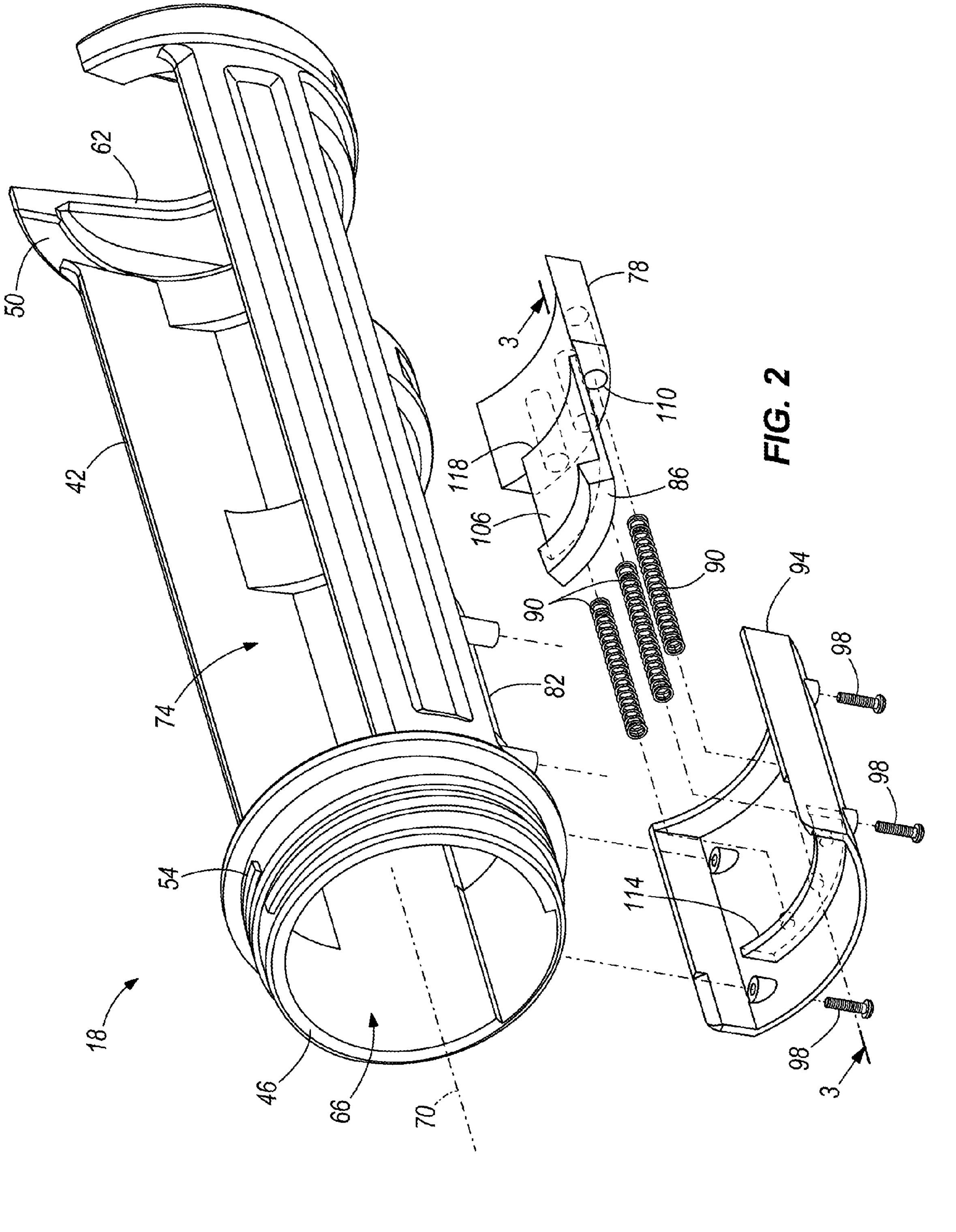
FIG. 2 is an exploded, enlarged view of the carriage assembly of FIG. 1.

With reference to FIG. 2, the assembly 18 includes a cartridge housing or a carriage 42 having an attachment end 46 that is attachable to the main housing 14 and an opposite dispensing end 50. In the illustrated embodiment of the carriage 42, the attachment end 46 includes an external thread 54 that is engaged with a corresponding internal thread (not shown) on a rotatable collar 58 of the dispensing tool 10 (FIG. 1). Alternatively, the attachment end 46 and the collar 58 may be configured in any of a number of different ways to facilitate rapid removal and installation of the carriage assembly 18 with respect to the main housing 14. With reference to FIG. 2, the dispensing end 50 of the carriage 42 includes a U-shaped slot 62 through which the nozzle of the cartridge protrudes.

The carriage 42 also includes an axial opening 66 oriented substantially normal to a longitudinal axis 70 of the carriage 42. The rack 30 and the plunger 34 are inserted through the axial opening 66 when the carriage assembly 18 is attached to the collar 58. The carriage 42 also includes a radial opening 74 through which the cartridge is insertable and removable when the rack 30 and plunger 34 are moved to a refracted position.

With continued reference to FIG. 2, the carriage assembly 18 also includes a clamp member 78 coupled to a peripheral wall 82 (FIG. 3) of the carriage 42. The clamp member 78 includes a finger 86 that protrudes through an opening in the carriage 42 toward the longitudinal axis 70 and that is engageable with the rear end 26 of the cartridge tube 22. A biasing member (e.g., one or more compression springs 90) exerts a force on the clamp member 78 for biasing the cartridge toward the dispensing end 50 of the carriage 42. As is described in more detail below, the clamp member 78, in combination with the dispensing end 50 of the carriage 42, is operable to clamp or secure the cartridge within the carriage 42. The cartridge is therefore firmly held in place within the carriage 42 irrespective of whether the plunger 34 is engaged with the piston in the cartridge.

Figure 3:
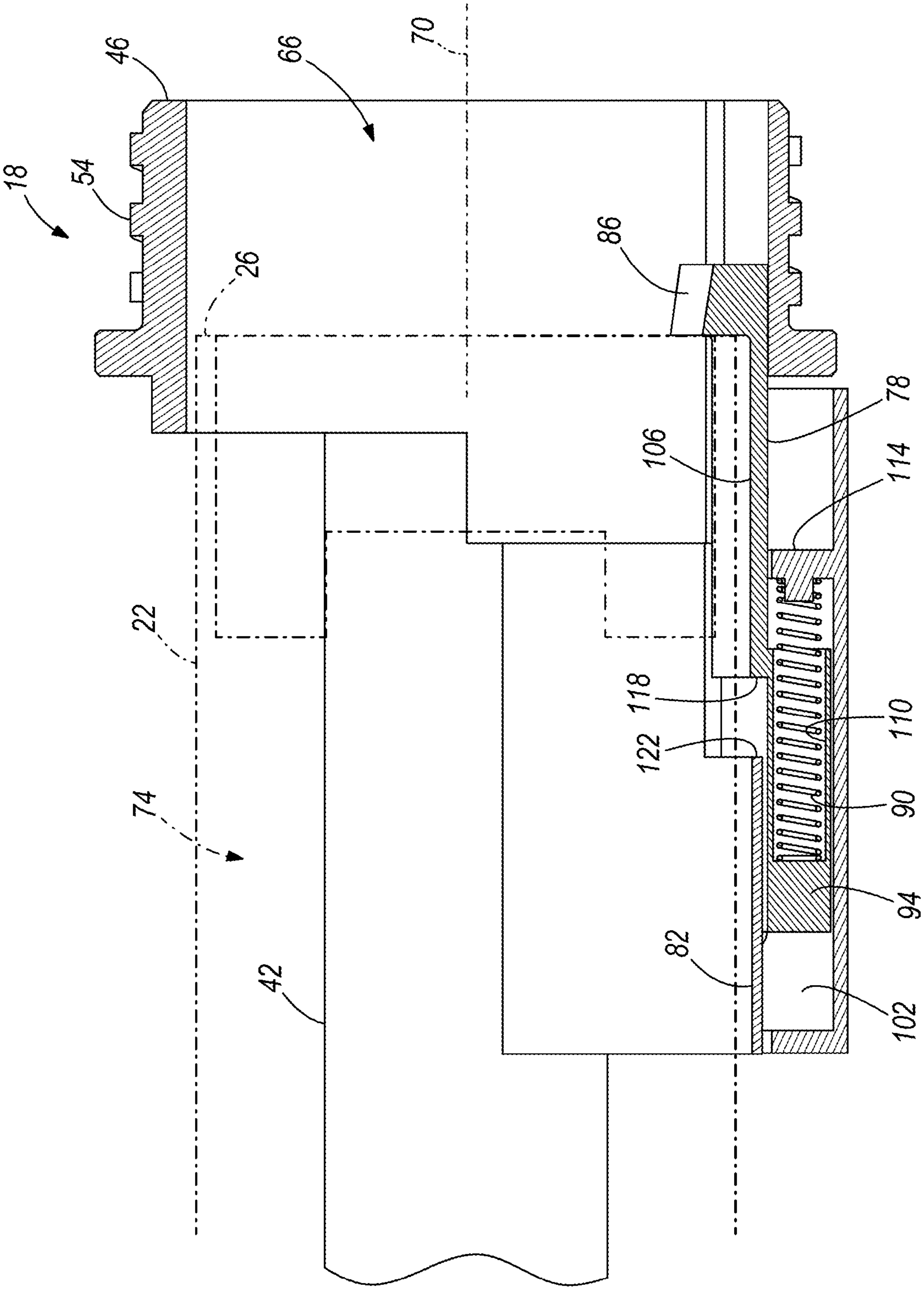
FIG. 3 is an enlarged, cross-sectional view of the carriage assembly of FIG. 1 through line 3-3 in FIG. 2.

With reference to FIGS. 2 and 3, the carriage assembly 18 further includes a cover 94 coupled to an underside of the peripheral wall 82 from the frame of reference of FIGS. 2 and 3. In the illustrated embodiment of the carriage assembly 18, the cover 94 is fastened (e.g., using screws 98) to the peripheral wall 82. Alternatively, the cover 94 may be secured to the peripheral wall 82 in any of a number of different ways (e.g., by using an interference fit, adhesives, by welding, etc.). At least a portion of the clamp member 78 is positioned between the peripheral wall 82 of the carriage 42 and the cover 94 (FIG. 3). Particularly, the peripheral wall 82 and the cover 94 define a space 102 in which the clamp member 78 is received using a snug, sliding fit. As such, movement of the clamp member 78 relative to the carriage 42 is limited to displacement in a direction that is substantially parallel to the longitudinal axis 70 of the carriage 42. The clamp member 78, therefore, is slidable against the bias of the springs 90 in a direction substantially parallel to the longitudinal axis 70. The remainder of the clamp member 78, including the finger 86, protrudes through an opening in the carriage 42 defined at least partially by the peripheral wall 82 and the attachment end 46.

Also, in the illustrated embodiment of the carriage assembly 18, the peripheral wall 82, the cover 94, and the clamp member 78 each include an arcuate cross-sectional shape (i.e., in a plane oriented normal to the longitudinal axis 70) to generally follow the contour of the outer periphery of the cartridge (FIG. 2). Particularly, the clamp member 78 includes an arcuate surface 106 exposed to an interior of the carriage 42 upon which the rear of the cartridge is supported. Likewise, the finger 86 includes an arcuate cross-sectional shape (i.e., in a plane oriented normal to the longitudinal axis 70) for engaging the cylindrical rear end 26 of the cartridge tube 22. Alternatively, the peripheral wall 82, the cover 94, and the clamp member 78 may include any of a number of different cross-sectional shapes.

With reference to FIGS. 2 and 3, the clamp member 78 includes a plurality of pockets 110 in which respective compression springs 90 are received. The exposed ends of the respective springs 90 are abutted against a flange 114 on the cover 94. As such, the springs 90 exert a biasing force on the clamp member 78 in a direction that is substantially parallel with the longitudinal axis 70. The clamp member 78 includes a lip 118 (FIG. 3) that is engageable with an edge 122 of the peripheral wall 82 to limit the extent to which the clamp member 78 is biased toward the dispensing end 50 of the carriage 42. The uncompressed length of each of the springs 90 exceeds the distance between a bottom surface of each of the pockets 110 and the flange 114. As such, the springs 90 are preloaded when the lip 118 is engaged with the edge 122 of the peripheral wall 82, corresponding with the absence of a cartridge within the carriage 42.

To insert a cartridge within the carriage 42, the user first retracts the rack 30 and the plunger 34 to ensure that sufficient spacing exists to insert the cartridge. Then, the rear end 26 of the cartridge tube 22 is inserted through the radial opening 74 in the carriage 42 and supported on the arcuate surface 106 of the clamp member 78. Depending on its placement, the rear end 26 of the cartridge tube 22 may or may not be engaging the finger 86 of the clamp member 78. The front end of the cartridge is then lowered through the radial opening 74 such that the nozzle is received within the U-shaped slot 62. As the front end of the cartridge is lowered, the user may exert a rearward force on the cartridge to cause the rear end 26 of the cartridge tube 22 to engage the finger 86. Continued exertion of the rearward force on the cartridge, against the bias of the springs 90, displaces the clamp member 78 toward the attachment end 46 of the carriage 42. After the nozzle is received within the U-shaped slot 62, the user may release the cartridge, causing the springs 90 to displace the clamp member 78 toward the dispensing end 50 of the carriage 42 as the springs 90 recover or are uncompressed.

The cartridge is therefore firmly held in place within the carriage 42 prior to the plunger 34 being engaged with the piston in the cartridge. The clamp member 78 would continue to firmly hold the cartridge against the dispensing end 50 of the carriage 42 should the plunger 34 be refracted from the cartridge piston following a period of operation of the tool 10. As such, the cartridge is prevented from sliding within the carriage 42 whenever the plunger 34 is retracted from the cartridge piston.

Figure 4:
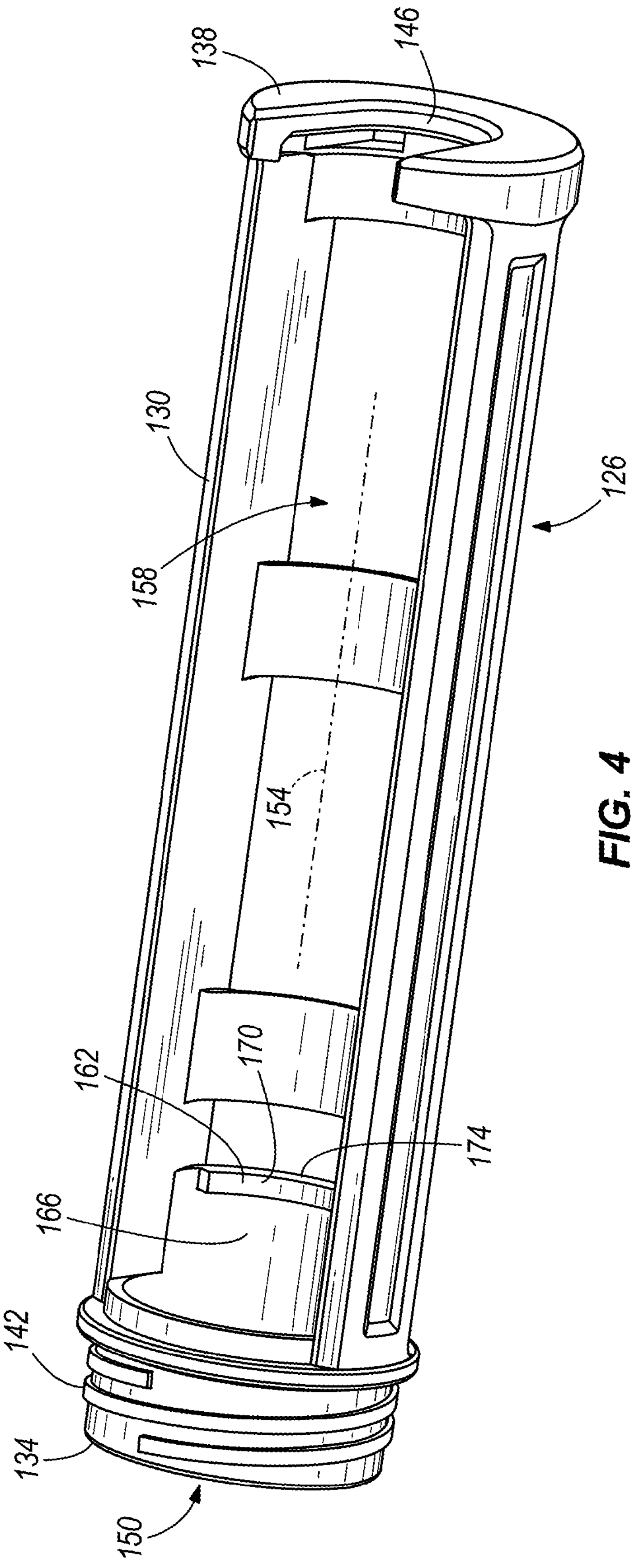
FIG. 4 is a perspective view of a carriage assembly according to another embodiment of the invention.

FIG. 4 illustrates a carriage assembly 126 according to another embodiment of the invention. The assembly 126 includes a cartridge housing or a carriage 130 having an attachment end 134 that is attachable to the main housing 14 and an opposite dispensing end 138. In the illustrated embodiment of the carriage 130, the attachment end 134 includes an external thread 142 that is engaged with a corresponding internal thread (not shown) on the rotatable collar 58 of the dispensing tool 10 (FIG. 1). Alternatively, the attachment end 134 and the collar 58 may be configured in any of a number of different ways to facilitate rapid removal and installation of the carriage assembly 126 with respect to the main housing 14. With reference to FIG. 4, the dispensing end 138 of the carriage 130 includes a U-shaped slot 146 through which the nozzle of the cartridge protrudes.

The carriage 130 also includes an axial opening 150 oriented substantially normal to a longitudinal axis 154 of the carriage 130. The rack 30 and the plunger 34 (FIG. 1) are inserted through the axial opening 150 when the carriage assembly 126 is attached to the collar 58. The carriage 130 also includes a radial opening 158 (FIG. 4) through which the cartridge is insertable and removable when the rack 30 and plunger 34 are moved to a retracted position.

The carriage assembly 126 also includes a lip 162 coupled to a peripheral wall 166 of the carriage 130. The lip 162 protrudes toward the longitudinal axis 154 and is engageable with the rear end 26 of the cartridge tube 22. In the illustrated embodiment of the carriage assembly 126, the peripheral wall 166 and the lip 162 each include an arcuate cross-sectional shape (i.e., in a plane oriented normal to the longitudinal axis 154) to generally follow the contour of the outer periphery of the cartridge. Particularly, the lip 162 includes an arcuate surface 170 in facing relationship with the longitudinal axis 154 upon which the rear of a "long" cartridge may be supported. The lip 162 includes an axial surface 174 that is engageable with the cylindrical rear end of a "short" cartridge. Alternatively, the peripheral wall 166 and the lip 162 may include any of a number of different cross-sectional shapes.

The position of the lip 162 on the peripheral wall 166 may substantially coincide with the location of the rear end of a short cartridge when the front end of the cartridge is abutted with the dispensing end 138 of the carriage 130. As such, displacement of the cartridge within the carriage 130 toward the attachment end 134 is limited by engagement of the rear end of the cartridge with the axial surface 174 of the lip 162. The cartridge is therefore held in place within the carriage 130 irrespective of whether the plunger 34 is engaged with the piston in the cartridge.

Figure 5:
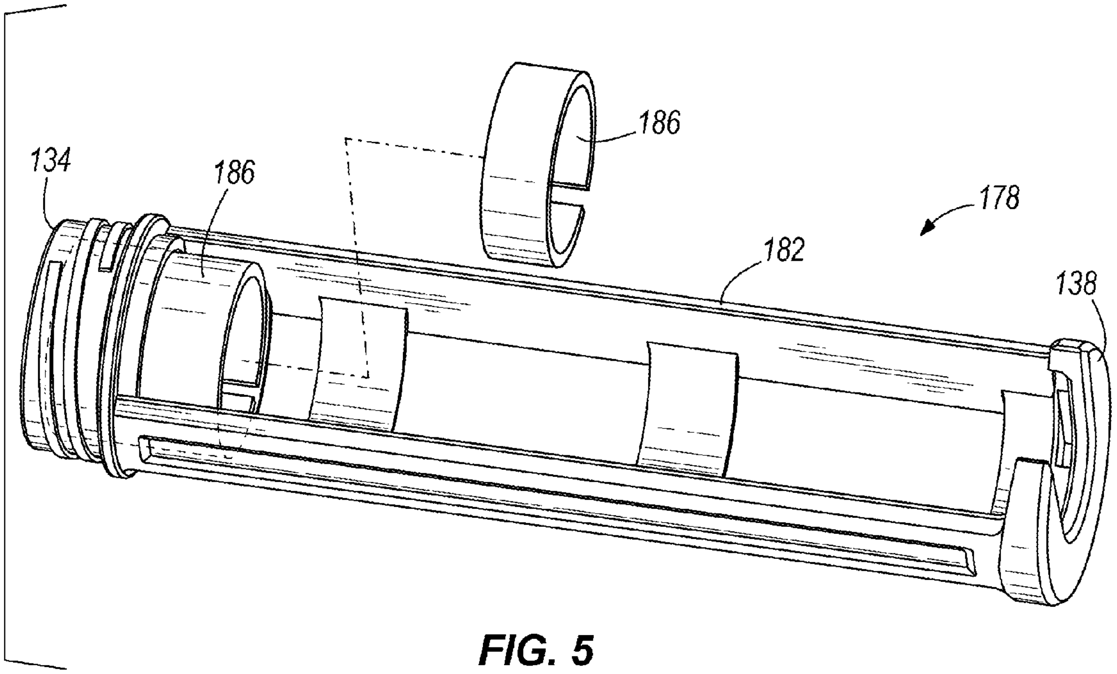
FIG. 5 is a perspective view of a carriage assembly according to yet another embodiment of the invention.

FIG. 5 illustrates a carriage assembly 178 according to yet another embodiment of the invention. The carriage assembly 178 includes a cartridge housing or a carriage 182 substantially identical to the carriage 130 shown in FIG. 4, but without the lip 162. As such, like components of the respective carriages 130, 182 are identified with like reference numerals.

Figure 6:
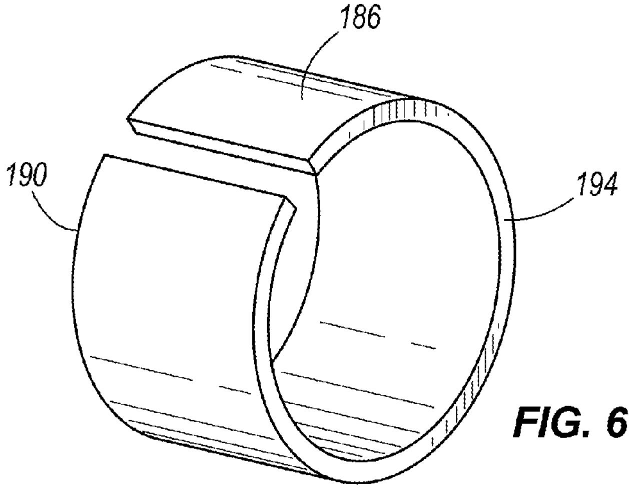
FIG. 6 is a perspective view of a spacer of the carriage assembly of FIG. 5.

The carriage assembly 178 includes a spacer 186 having an outer diameter sized to provide an interference or friction fit with the interior of the carriage 182. The spacer 186 also includes an inner diameter that is sufficiently large to permit passage of the plunger 34, yet sufficiently small to interfere with the cartridge to prohibit movement of the cartridge within the carriage 182. The spacer 186 also includes a first end 190 that is engageable with an axial surface on the collar 58, the main housing 14, or another component of the dispensing tool 10, while a second end 194 of the spacer 186 is engageable with a rear end of a cartridge tube (FIG. 6). As such, the length of the spacer 186 is sufficient to ensure that the front end of the cartridge remains abutted with the dispensing end 138 of the carriage 182. In other words, displacement of the cartridge within the carriage 182 toward the attachment end 134 is limited by engagement of the rear end of the cartridge with the spacer 186. The cartridge is therefore held in place within the carriage 182 irrespective of whether the plunger 34 is engaged with the piston in the cartridge.

With reference to FIG. 5, multiple spacers 186 may be provided with the dispensing tool 10 to accommodate cartridges of various lengths. As such, when switching from a first cartridge having a first length to a second cartridge having a second, greater length, the spacer 186 could also be interchanged with another spacer 186 having an appropriate length to prohibit displacement of the second cartridge within the carriage 130 when the plunger 34 is not engaged with the piston in the second cartridge.

Various features of the invention are set forth in the following claims.

What is claimed is:

1. A carriage assembly for a dispensing tool, the assembly comprising:

a carriage having an attachment end that is attachable to the dispensing tool and an opposite dispensing end;

at least one of an axial opening in the carriage oriented substantially normal to a longitudinal axis of the carriage and a radial opening through which a material-containing cartridge is insertable;

a clamp member coupled to a peripheral wall of the carriage that is below the cartridge, the clamp member having a portion that protrudes toward the longitudinal axis and that is engageable with a rear end of the cartridge;

a cover coupled to the peripheral wall of the carriage, wherein at least a portion of the clamp member is positioned between the peripheral wall and the cover; and a biasing member that exerts a force on the clamp member for biasing the cartridge toward the dispensing end.

2. The carriage assembly of claim 1, wherein the biasing member exerts the force on the clamp member in a direction toward the dispensing end of the carriage.

3. The carriage assembly of claim 1, wherein the biasing member is a compression spring.

4. The carriage assembly of claim 1, wherein the clamp member is slidable against the bias of the biasing member in a direction substantially parallel to the longitudinal axis.

5. The carriage assembly of claim 1, wherein the cover includes a flange, and wherein the biasing member is positioned between the flange and the clamp member.

6. The carriage assembly of claim 5, wherein the clamp member includes a pocket, and wherein the biasing member is at least partially received within the pocket.

7. The carriage assembly of claim 1, wherein the clamp member includes a lip that is engageable with an edge of the peripheral wall to limit the extent to which the clamp member is biased toward the dispensing end of the carriage.

8. The carriage assembly of claim 1, wherein the clamp member includes an arcuate surface exposed to an interior of the carriage.

9. The carriage assembly of claim 8, wherein the arcuate surface is substantially aligned with an interior surface of the peripheral wall of the carriage.

10. The carriage assembly of claim 9, wherein a rear end of the cartridge is at least partially supportable by the arcuate surface.

11. The carriage assembly of claim 1, wherein the portion of the clamp member that protrudes toward the longitudinal axis and that is engageable with the rear end of the cartridge is configured as an arcuate finger.

12. The carriage assembly of claim 1, wherein the clamp member is located proximate the attachment end of the carriage.

* * * * *